July 1, 1930.   A. T. KELLER   1,769,842
OPEN HEARTH FURNACE
Filed Dec. 5, 1921   2 Sheets-Sheet 1
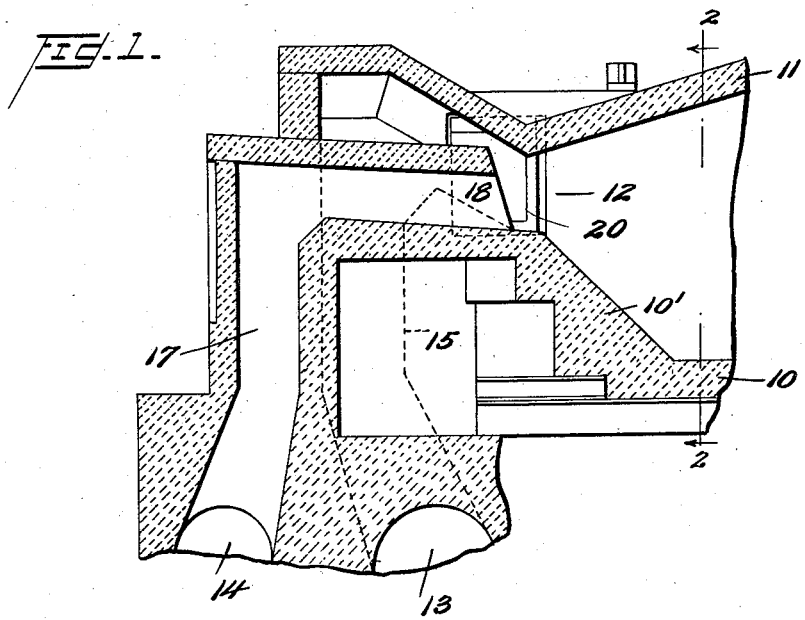
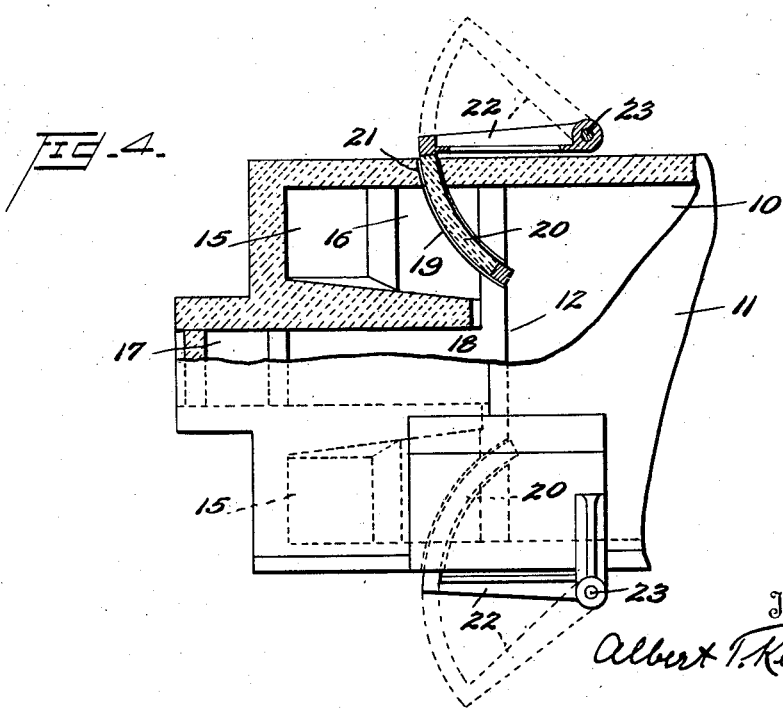

July 1, 1930.  A. T. KELLER  1,769,842
OPEN HEARTH FURNACE
Filed Dec. 5, 1921   2 Sheets-Sheet 2
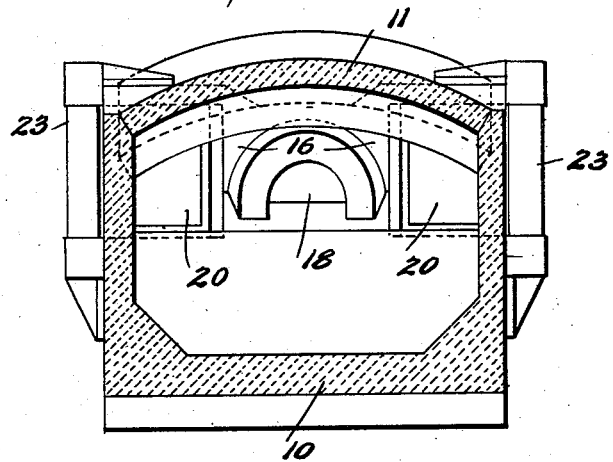
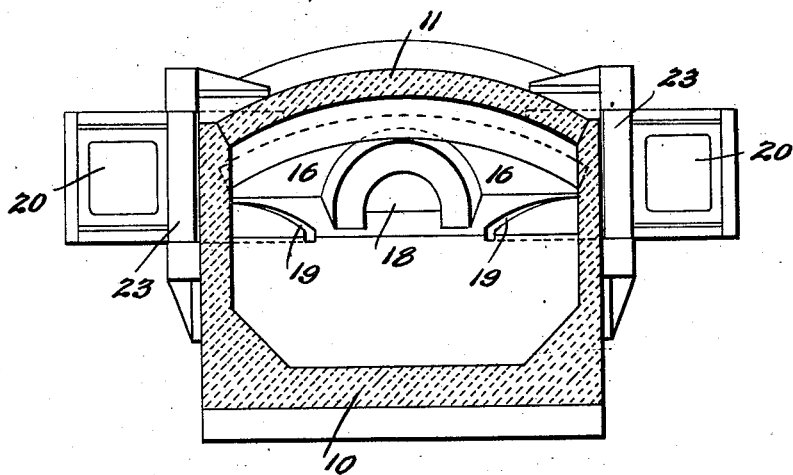

Patented July 1, 1930

1,769,842

UNITED STATES PATENT OFFICE

ALBERT T. KELLER, OF BETHLEHEM, PENNSYLVANIA, ASSIGNOR, BY MESNE ASSIGNMENTS, TO OPEN HEARTH COMBUSTION COMPANY, A CORPORATION OF NEW JERSEY

OPEN-HEARTH FURNACE

Application filed December 5, 1921. Serial No. 520,042.

The present invention relates to regenerative furnaces and particularly to regenerative reverberatory furnaces of the type utilized in the meltitng of the charge in the manufacture of steel by the open-hearth process.

The object of the invention is to provide a furnace of this type having novel means for controlling the incoming fuel and the port area for the outgoing products of combustion whereby the charge may be melted more quickly than in the ordinary open-hearth furnace, thereby increasing the rate of production of the furnace and without at the same time shortening its life.

One embodiment of the invention is illustrated in the accompanying drawings in which:

Figure 1 is a vertical longitudinal central section through one end of the furnace;

Figure 2 is a section on line 2—2 of Figure 1;

Figure 3 is a similar section but showing certain parts in different positions; and Figure 4 is a plan view of the end of the furnace, partly broken away.

It will be understood that the ends of the furnace are preferably similarly constructed. The hearth is indicated at 10 and is of usual construction, having the upwardly inclined end wall 10', and the roof 11 slopes downwardly towards the throat 12 through which the air and combustible gas to be burned pass to the combustion chamber at the inlet end of the furnace and the products of combustion pass at the outlet end of the furnace. This throat is long and relatively narrow in cross section, as can be seen in Figures 2 and 3, and in the usual construction of the furnace will have a curved top and a straight horizontal bottom. It will be understood however that the precise cross sectional shape of the throat may be varied as desired.

The roof of the furnace beyond the throat slopes upwardly and outwardly while the floor is substantially horizontal. Flues leading to air and gas regenerating chambers are indicated at 13 and 14 respectively, and air uptakes 15 lead upwardly from the flue 13 to ports 16 in the floor of the furnace beyond the throat, and a gas uptake 17 leads from the flue 14 upwardly horizontally toward the combustion chamber, terminating in a gas outlet port 18 positioned centrally of the furnace and arranged to discharge gases through the throat 12 and into the combustion chamber.

When the end of the furnace illustrated is serving as an inlet end, air and gas pass through the uptake flues 15 and 17 and thence through the throat 12 and into the combustion chamber, where they are burned. In order to regulate or throttle the flow of air and at the same time to maintain its direction of flow from the ports 16 toward the center of the furnace, that is, toward the stream of gas issuing from the port 18, suitable dampers or throttling devices now to be described are provided.

Formed in the floor of the furnace at the throat are grooves 19, which are curved as illustrated, and similar grooves are also formed in the roof directly above. Each such pair of grooves constitutes a trackway for a cylindrical damper 20 which projects into the throat through a slot 21. The dampers 20 are supported on arms 22 pivotally mounted at 23 on the outside of the furnace and are adapted to be swung about these pivotal axes into or out of the furnace to decrease or increase as desired the effective area of the throat, thus enabling the air supply to be throttled as desired, although it is never completely cut off. The gas port 18 is never obstructed by the dampers or throttling devices.

The dampers being curved, with their convex surfaces toward the air ports, serve as means for directing the incoming air on each side of the furnace toward the stream of incoming gas so that a combustible mixture is formed as the gas passes through the throat. The dampers 20 serve to direct the air in this manner even when moved outwardly to increase the effective area of the throat, for all positions of the dampers, except of course when they are completely withdrawn from the furnace.

When the end of the furnace illustrated is functioning as the outlet for the products of combustion, the dampers 20 may be completely withdrawn, as shown in Figure 3, so that the throat is unobstructed and its entire cross-sectional area is effective for carrying off the hot gases, which pass downwardly through the flues 15 and 17 to the regenerating chambers. The area of the unobstructed throat is such that burning out of the walls of the gas port does not take place and the outgoing stream of products of combustion is not checked even when the incoming gas or air, or both, are under pressure.

The invention may be embodied in various types of furnaces and is not limited to any specific construction, within the scope of the appended claims.

It will be understood that by the word "hearth" used in the appended claims to indicate the chamber into which the throat opens is meant "combustion chamber." The combustion chamber is the chamber between the throats and enclosed by the hearth proper 10, 10', the roof 11, and the side walls.

Having thus described the invention what I claim as new and desire to secure by Letters Patent is:

1. An end construction for regenerative open hearth furnaces having a throat for the passage of fuel to the hearth or for the escape of products of combustion, and means for varying the effective area of the throat including a damper pivotally supported on the outside of the furnace and adapted to be swung into and out of the throat through an opening in the side wall, said damper being curved about its pivotal axis as a center.

2. An end construction for regenerative open hearth furnaces having a throat for the passage of fuel to the hearth or for the escape of products of combustion, and means for varying the effective area of the throat including two curved dampers movable into the throat from opposite sides thereof, the convex sides of said dampers facing away from the hearth.

3. An end construction for regenerative open hearth furnaces having a throat for the passage of fuel to the hearth or for the escape of products of combustion, and means for varying the effective area of the throat including two dampers one on each side and being movable horizontally through the side wall of the furnace into the throat, and grooves in the roof and floor of the furnace to receive the upper and lower edges of the dampers.

In testimony whereof I hereunto affix my signature.

ALBERT T. KELLER.